US005719933A

United States Patent [19]
Welch

[11] Patent Number: 5,719,933

[45] Date of Patent: Feb. 17, 1998

[54] WIRING ARRANGEMENT FOR A COMMUNICATION INTERCONNECTION SYSTEM

[76] Inventor: Richard Welch, 909 Ludwig Rd., Fort Wayne, Ind. 46825

[21] Appl. No.: 198,826

[22] Filed: Feb. 18, 1994

[51] Int. Cl.$^{6}$ .............................. H04M 1/00; H01B 11/00; H01R 13/50

[52] U.S. Cl. .............................. 379/397; 379/399; 174/32; 174/36; 439/623; 439/638

[58] Field of Search .............................. 379/397, 399, 379/416, 417, 93; 339/156; 174/115, 117, 32, 35 C, 36; 439/502, 65, 638, 654, 623, 624, 628

[56] References Cited

U.S. PATENT DOCUMENTS

| | | | |
|---|---|---|---|
| Re. 31,733 | 11/1984 | Haworth et al. . | |
| 1,718,252 | 6/1929 | Putnam | 307/147 |
| 2,845,605 | 7/1958 | Gorman et al. | 439/624 |
| 2,862,117 | 11/1958 | Rowe et al. | 307/147 |
| 3,248,576 | 4/1966 | Russell | 307/147 |
| 3,715,627 | 2/1973 | D'Ausilio | 361/643 |
| 3,949,277 | 4/1976 | Yosset | 361/686 |
| 3,984,622 | 10/1976 | Ross | 174/72 A |
| 3,990,763 | 11/1976 | Kress | 439/652 |
| 4,001,571 | 1/1977 | Martin | 315/189 |
| 4,016,369 | 4/1977 | Pedersen | 370/449 |
| 4,060,294 | 11/1977 | Haworth et al. | 439/215 |
| 4,070,548 | 1/1978 | Kasper | 439/147 |
| 4,135,775 | 1/1979 | Driscoll | 439/215 |
| 4,227,764 | 10/1980 | Fiske | 439/367 |
| 4,239,320 | 12/1980 | Hesse et al. | 439/640 |
| 4,253,087 | 2/1981 | Saal | 340/825.52 |
| 4,270,020 | 5/1981 | Kenworthy et al. | 174/48 |
| 4,290,664 | 9/1981 | Davis et al. | 339/156 R |
| 4,370,008 | 1/1983 | Haworth et al. | 439/165 |
| 4,392,701 | 7/1983 | Weidler | 439/76.1 |
| 4,408,819 | 10/1983 | Guelden | 439/638 |
| 4,523,191 | 6/1985 | Cretin et al. | 340/825.52 |
| 4,533,790 | 8/1985 | Johnston et al. | 174/36 |
| 4,577,191 | 3/1986 | Pargee, Jr. | 340/825.52 |
| 4,603,320 | 7/1986 | Farago | 340/347 |
| 4,626,846 | 12/1986 | Parker et al. | 340/825.52 |
| 4,662,701 | 5/1987 | Lane | 439/676 |
| 4,753,606 | 6/1988 | DeLuca et al. | 439/374 |
| 4,954,101 | 9/1990 | Nelson | 439/502 |
| 5,053,583 | 10/1991 | Miller et al. | 174/36 |
| 5,160,276 | 11/1992 | Marsh et al. | 439/502 |

*Primary Examiner*—Jack Chiang
*Assistant Examiner*—Jacques M. Saint-Surin
*Attorney, Agent, or Firm*—Barnes & Thornburg

[57] ABSTRACT

A wiring arrangement for providing communications channels to a plurality workstations having at least one communications connector provided at each workstation is disclosed. The workstations are linked by a plurality of modular assemblies comprising a pair of connectors joined by connecting cables. Each connector includes data transmission, data reception and phone terminals. The connecting cables connect the terminals of the first connector to the terminals of the second connector of the modular assembly such that corresponding types of terminals are connected in inverted order. The connectors are electrically coupled to ports at each workstation. One end of one modular assembly is used to link the workstations to a communications center. Interconnection modules at each workstation connect the ports, and therefore the modular assemblies, in a predetermined wiring pattern, depending on the desired configuration of the workstations. Specifically, the interconnection modules provide access to communications channels at the workstation, pass communications channels to branched workstations, and pass communications channels along the main line of workstations. The channels passed along the main line of workstations are inverted within the interconnection module. The other channels are passed through the interconnection module in the order in which they enter the module.

20 Claims, 6 Drawing Sheets

WIRING ARRANGEMENT FOR A COMMUNICATION INTERCONNECTION SYSTEM

BACKGROUND AND SUMMARY OF THE INVENTION

The present invention relates to a modular wiring arrangement for supplying communication channels to workstations or cubicals. More particularly, the invention relates to modular wiring assemblies which can be interconnected to supply both voice and data channels to individual workstations from a communication distribution center.

Providing communication facilities to individual workstations and offices requires a significant amount of electrical wiring. In typical workstation wiring arrangements, each workstation is individually field wired to telephone or computer lines, with separate lines extending directly from input/output lines of a communication distribution center to a communication connector at each of the workstations. If standard four terminal telephones are installed at each workstation, this traditional type of wiring arrangement requires four electrical wires running from each workstation to the communication distribution center. A like number of wires may also be required for data communications. Maintaining, replacing, or adding new workstations having appropriate communication connectors requires a substantial investment in time and materials using the traditional wiring arrangement.

One method of simplifying office wiring by consolidating wire and connection sites is described in U.S. Pat. No. 5,160,276. That patent discloses a wiring arrangement for distributing communication channels to a plurality of workstations. That invention utilizes a plurality of modular assemblies comprising two connectors. The assemblies are serially arranged to link workstations to a communication distribution center. Each connector has m terminals. The terminals of one connector are electrically coupled to the other connector of the assembly by means of wires. The m terminals of a first connector of one modular assembly matingly engage the m terminals of a second connector of an adjacent modular assembly. Similarly, the second connector of the first modular assembly matingly engages the first connector of another adjacent modular assembly. As a result, a serial "chain" is formed. Each connector has an associated communications connector for input/output of voice or data communications at each workstation. At one end, the chain is connected to a data communications bus, while the other end is connected to a voice communications bus. A permutated connection scheme between the first and second connectors of each modular assembly allows for a more efficient utilization of conductors than was traditionally allowable, such that the plurality of workstations located along the chain are electrically connected to both buses with fewer wires than would otherwise be employed.

Although the above-described invention provides significant advantages over prior methods of wiring multiple workstations, it has certain limitations. Specifically, the permutation scheme between the connectors at opposite ends of the modular assemblies does not allow for branching workstations. That is, it is not possible to provide a plurality of workstations extending one direction and another plurality of workstations branched therefrom and extending a different direction. The fact that one end of the chain is hooked to a voice communications bus and the other end is hooked to a data communications bus also prevents workstations from being branched along the chain. Thus, the possible office configurations are somewhat limited.

Prior wiring systems have additional limitations. In particular, near end cross-talk between the data transmission and data reception lines of the wiring systems limits the transmission rates at which the systems can be effectively operated. Also, prior systems often used connectors that must be oriented in a specific direction. Thus, installation of such systems may be more complicated than is desired.

Accordingly, it is an object of the present invention to provide an improved wiring arrangement for providing access to communications channels at a plurality of workstations.

Another object of the present invention is to provide an arrangement for providing access to communications channels at a plurality of workstations that may be branched from a main line of workstations.

Yet another object of the present invention is to provide a wiring arrangement for providing access to communications channels at a plurality of workstations wherein the means for connecting the various workstations do not require specific orientations.

These and other objects of the present invention are attained by the provision of a plurality of workstations having at least one communications connector provided at each workstation. The workstations are linked by a plurality of modular assemblies comprising a pair of connectors joined by connecting cables. Each connector includes data transmission, data reception and phone terminals. The connecting cables connect the terminals of the first connector to the terminals of the second connector of the modular assembly such that corresponding types of terminals are connected in inverted order. The connectors are electrically coupled to ports at each workstation. One end of one modular assembly is used to link the workstations to a communications center. Interconnection modules at each workstation connect the ports, and therefore the modular assemblies, in a predetermined wiring pattern, depending on the desired configuration of the workstations. Specifically, the interconnection modules provide access to communications channels at the workstation, pass communications channels to branched workstations, and pass communications channels along the main line of workstations. The channels passed along the main line of workstations are inverted within the interconnection module. The other channels are passed through the interconnection module in the order in which they enter the module.

Other advantages and novel features of the present invention will become apparent from the following Detailed Description of the Preferred Embodiments when considered in conjunction with the accompanying drawings.

DETAILED DESCRIPTION OF THE PREFERRED EMBODIMENTS

Figure 1:
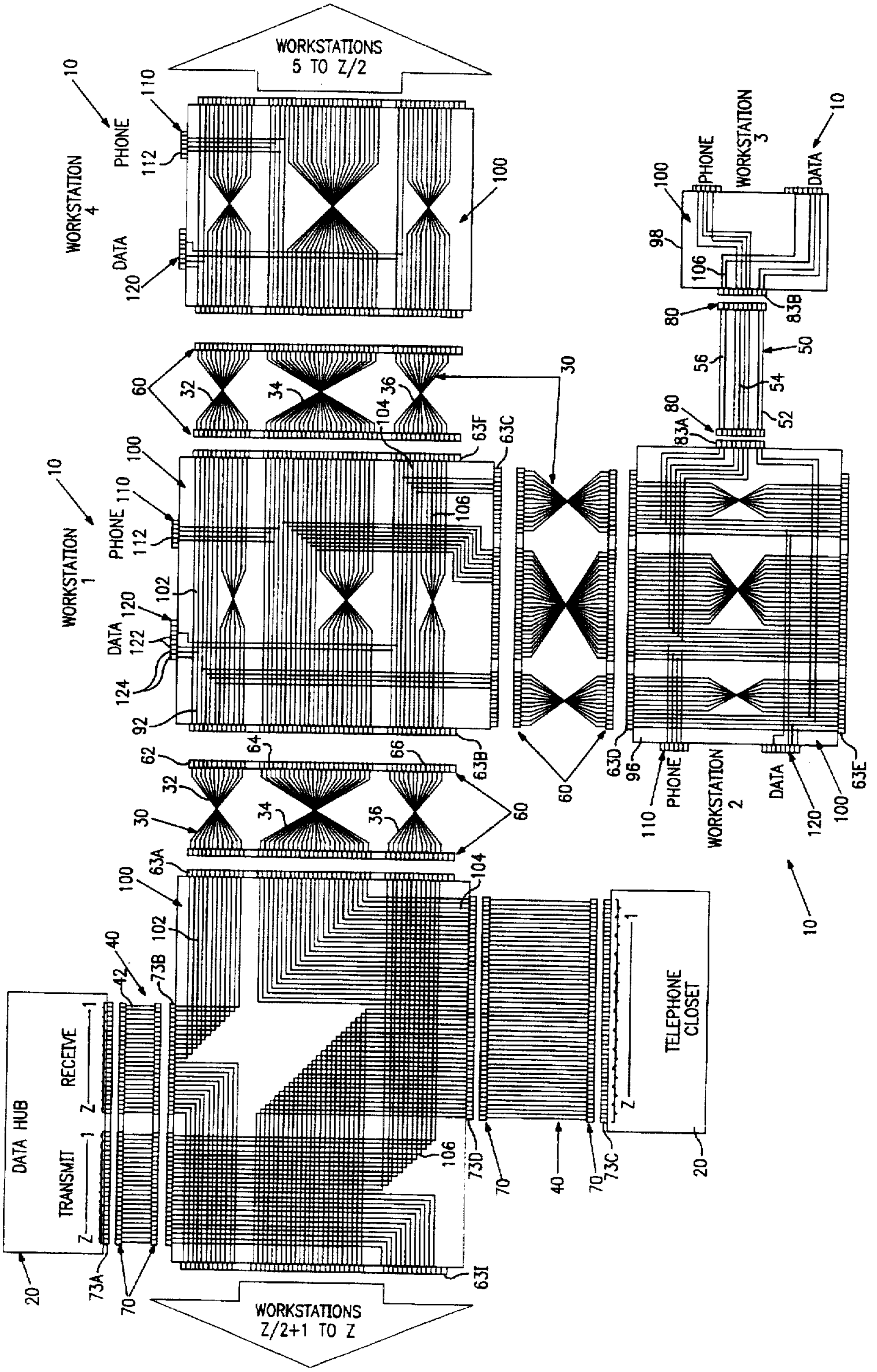
FIG. 1 shows a schematic diagram of a wiring arrangement for providing access to communications channels at a plurality of work-stations according to the present invention.

FIG. 1 shows a schematic view of an arrangement for providing access to communications channels at a plurality of workstations. The system includes workstations 10, communications center 20, connecting cables 30, 40 and 50, connectors 60, 70 and 80, interconnection modules 90, 92, 94, 96 and 98, and circuits 100.

Each workstation 10 in FIG. 1 represents a typical office workstation at which communications channels may be desired. Communications center 20 includes a data hub having data transmission/reception port 73A. Communications center 20 further includes a telephone closet having phone port 73C.

Figure 2:
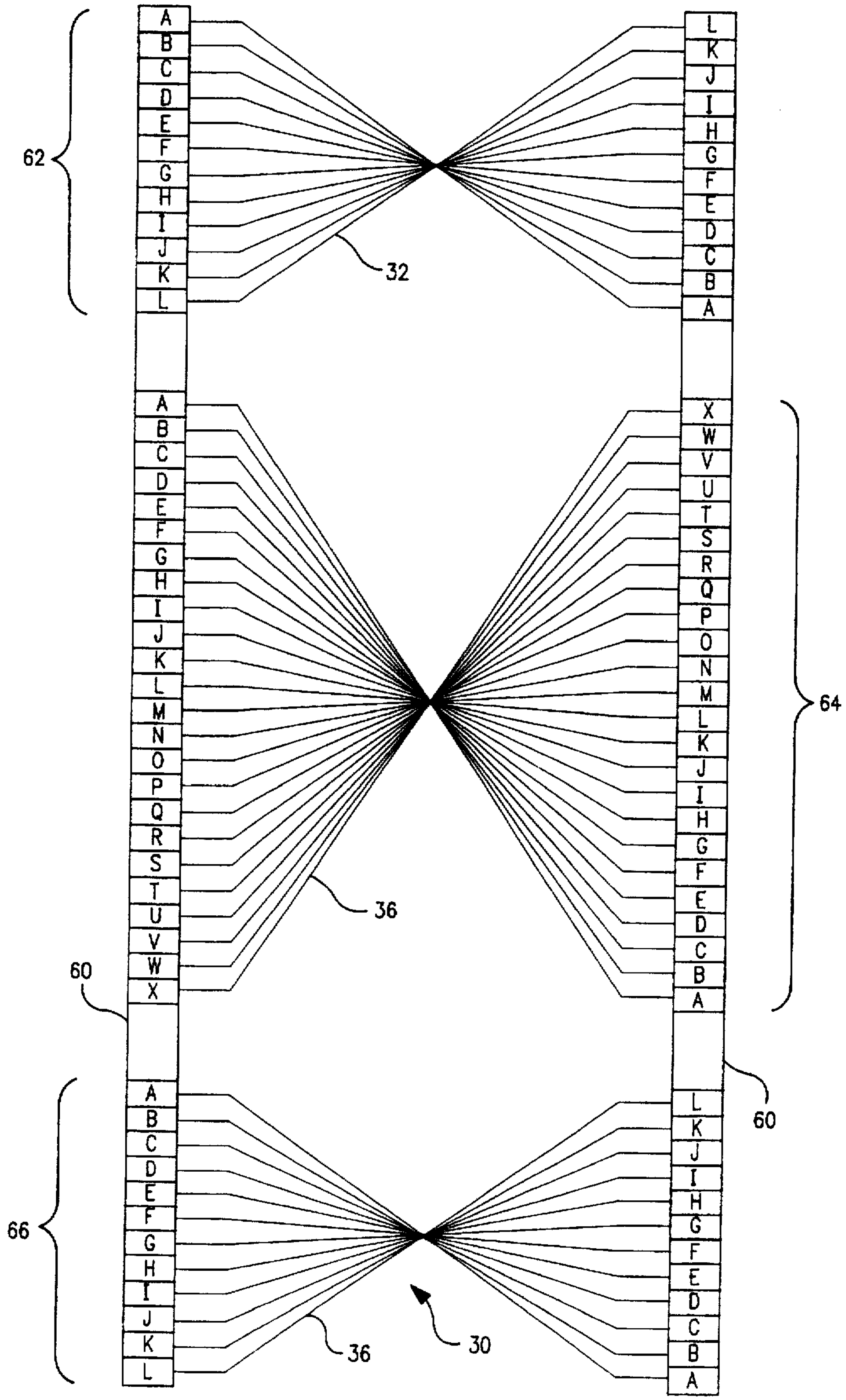
FIG. 2 shows a schematic diagram of a first type of modular assembly according to the present invention.

Connecting cables 30 include data reception cables 32, phone cables 34 and data transmission cables 36. Each end of connecting cables 30 is attached to a connector 60. Together, a connecting cable 30 and its associated connectors 60 form a modular assembly 35 (illustrated below). Connectors 60 include data reception terminals 62, phone terminals 64 and data transmission terminals 66. Connectors 60 mate with ports 63*x* (where x represents a letter A through I) to transmit signals from one point to another along the series of workstations. Each port 63*x* has corresponding data reception terminals 62, phone terminals 64 and data transmission terminals 66. Note that connectors 60 and ports 63*x* each have extra or empty terminals that are not coupled to data reception cables 32, phone cables 34, or data transmission cables 36. These empty terminals do not constitute data reception, data transmission or phone terminals. Data reception cables 32, phone cables 34 and data transmission cables 36 are connected to two connectors 60 in inverted order within each group of terminals. FIG. 2 illustrates this connection pattern. Data reception cables 32 and data transmission cables 36 have been labeled A–L and phone cables 34 have been labeled A–X to illustrate this point. At the left end of data reception cables 32, for example, the first cable A is coupled to the first data reception terminal 62. On the right hand side, cable A is electrically coupled to the last data reception terminal 62. The remaining data reception cables follow the same pattern. Phone cables 34 and data transmission cables 36 are similarly inverted between connectors 60.

Connecting cable 50 between workstation 2 and workstation 3 includes data reception cables 52, phone cables 54 and data transmission cables 56. Each end of connecting cable 50 is electrically coupled to a connector 80. Together, connecting cable 50 and connectors 80 form a modular assembly 55. Connectors 80 engage ports 83*x*. Each connector 80 includes data reception terminals 82, phone terminals 84 and data transmission terminals 86. Ports 83*x* include corresponding terminals. Again, connectors 80 and ports 83*x*, like connectors 60 and ports 63*x*, include unused or empty terminals which do not constitute data reception, phone, or data transmission terminals.

Connecting cables 40 include a plurality of individual cables 42 therein. Each end of connecting cables 40 is attached to a connector 70. Each connector 70 has a plurality of terminals 72. Connectors 70 mate with ports 73*x* as described below. Each port 73*x* has corresponding terminals. Together, a connecting cable 40 and its associated connectors 70 form a modular assembly 45.

Interconnection modules 90, 92, 94, 96 and 98 are disposed between modular assemblies 35, 45 and 55 as described below. Each interconnection module has a pair of communications connectors 110 and 120 associated therewith. Connector 110 includes phone terminals 112 and is used for access to phone communication channels. Connector 120 includes data reception terminals 122 and data transmission terminals 124 and is used for access to data communication channels. Again, communications connectors 110 and 120 each include unused or empty terminals that do not constitute phone, data reception or data transmission terminals. The interconnection modules are preferably printed circuit boards having circuits 100 stamped thereon. Circuits 100 include data reception lines 102, phone lines 104 and data transmission lines 106.

As shown in FIG. 1, interconnection modules 90, 92, 94, 96 and 98 have the same basic components; however, the number and placement of the various ports and the configuration of circuits 100 varies. Thus, several types of interconnection modules may be utilized, depending on the workstation configuration desired. For example, interconnection module 92, associated with workstation 1, provides access to data and phone lines at workstation 1, branches two additional workstations from workstation 1 in one direction, and passes three additional workstations down the line. This is accomplished by electrically coupling the first two data reception lines 102 and data transmission lines 106 to communications connector 120 via data transmission terminals 124 and data reception terminals 122. Similarly, the first four phone lines 104 are electrically coupled to communications connector 110 via phone terminals 112. The next four data reception lines 102, the next eight phone lines 104 and the next four data transmission lines 106 are electrically coupled to port 63C, for eventual passing through to workstations 2 and 3. All of these lines are also passed straight through interconnection module 92 to port 63F. The remaining data reception lines 102, phone lines 104 and data transmission lines 106 are inverted in the same fashion as the cables which comprise connecting cables 30 and passed through interconnection module 92 to port 63F. Each modular assembly 35 passes through the circuit lines to the next interconnection module in inverted order. As a result, circuit lines 102, 104 and 106 which were tapped off of at workstation 1 are passed to the bottom of their respective terminal groups at workstation 4. The remaining lines are passed to the top of their respective terminal groups, where they may be accessed at the next workstation. Conversely, the circuit lines tapped off of at workstation 1 and passed to workstation 2 are passed directly to the last terminals in their respective group. As a result, modular assembly 35 passes these lines to the top terminals at workstation 2, where they can be tapped off of at that workstation.

Interconnection modules 94 and 96 at workstations 2 and 4 work on the same principle as interconnection module 92. Namely, circuit lines are tapped off to provide access to communications channels at a particular workstation or to be branched from the main line. The circuits tapped off of are passed straight through to an associated port 63*x* or 53*x*. The remaining lines are inverted within the interconnection module before being passed to a port 63*x* to be passed to the next workstation. The different configurations of interconnection modules depend solely on the number of workstations to be branched or passed down the main line.

Note that if a single workstation is to be branched from the main line (such as workstation 3), interconnection module 98 for the branched workstation does not invert any of the circuit lines 100. Rather, interconnection module 98 passes circuit lines 100 to communications connectors 110 and 120.

Note that in the foregoing discussion the terms "transmission" and "reception" are defined with respect to the data hub at communication center 20 when referring to data reception lines 102 and data transmission lines 106. However, they are used with reference to communications connector 120 when referring to data reception terminals 122 and data transmission terminals 124. Thus, data transmission lines 106 are coupled to data reception terminals 122 at each communications connector 120. Similarly, data transmission terminals 124 of communications connector 120 are coupled to data reception lines 102. Accordingly, the data hub transmits to the reception terminals 122 via data transmission lines 106 and data transmission terminals 124 transmit to the data hub via data reception lines 102.

Figure 4:
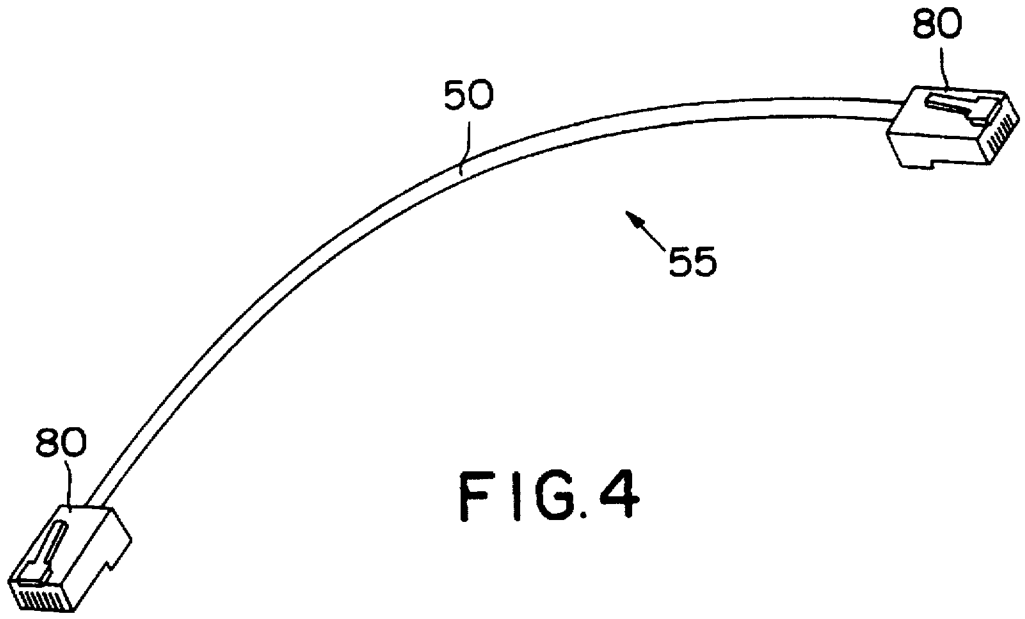
FIG. 4 shows a second type of modular assembly according to the present invention.
Figure 3:
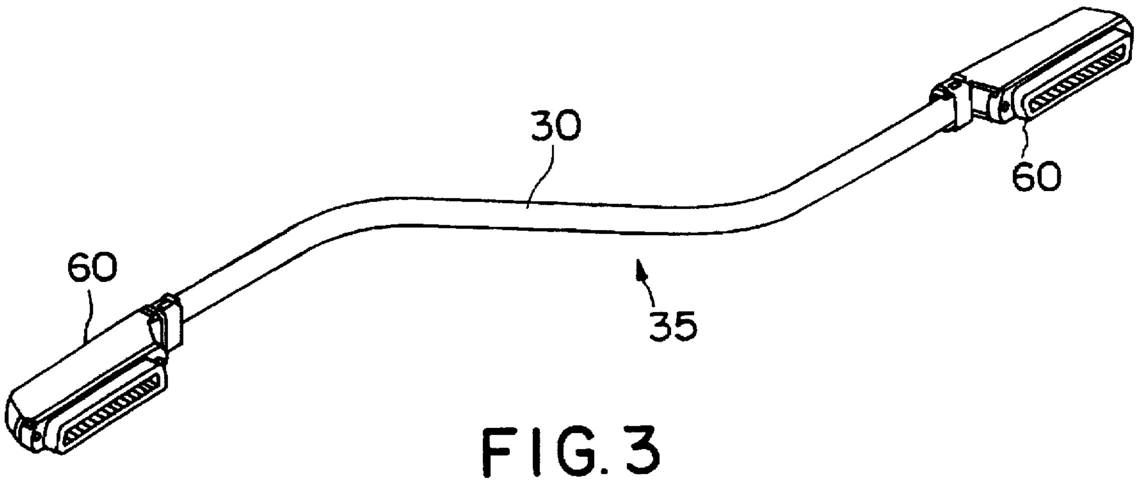
FIG. 3 shows a first type of modular assembly according to the present invention.

FIG. 3 shows a preferred embodiment of a modular assembly 35, comprising connecting cable 30 and two connectors 60, according to the present invention. Connecting cable 30 has covering 38 and connectors 60 disposed on each end thereof. Similarly, FIG. 4 illustrates a modular assembly 55 having connecting cable 50 with connectors 80 disposed on both ends thereof.

Figure 5:
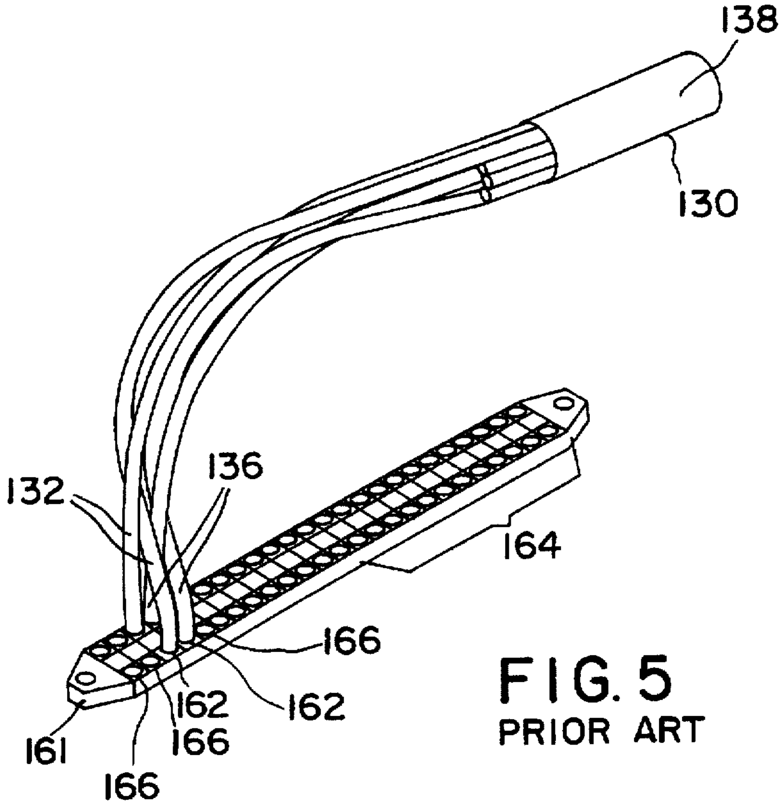
FIG. 5 PRIOR ART
FIG. 5 shows a prior art method of connecting communications cables to a connector of a modular assembly.

FIG. 5 illustrates a prior art method of attaching connecting cable 30 to the terminals of connector 60. In FIG. 5, the numeral "1" has been added to reference numbers to show correspondence with elements in the foregoing drawings. As can be seen in FIG. 5, data reception cables 132 and data transmission cables 136 are attached to the back side of their respective terminals 162 and 166 on terminal block 161, which is an interior component of connector 160. As shown in FIG. 5, the traditional manner of attaching data transmission cables 136 and data reception cables 132 to terminals 166 and 162 began with data reception cables 132, for example, being attached to the first pair of terminals 162. The next set of terminals 166 were attached to data transmission cables 136. This pattern continued until all data reception terminals 162 and data transmission terminals 166 had been wired. Remaining phone terminals 164 were then connected to phone cables 134 (not shown). However, because of the close nexus between data reception cables 132 and data transmission cables 136, both within covering 138 of cable 130 and at connector 160, near end cross-talk often occurred between these cables. Thus, the speed at which the system could be run was limited.

Figure 6:
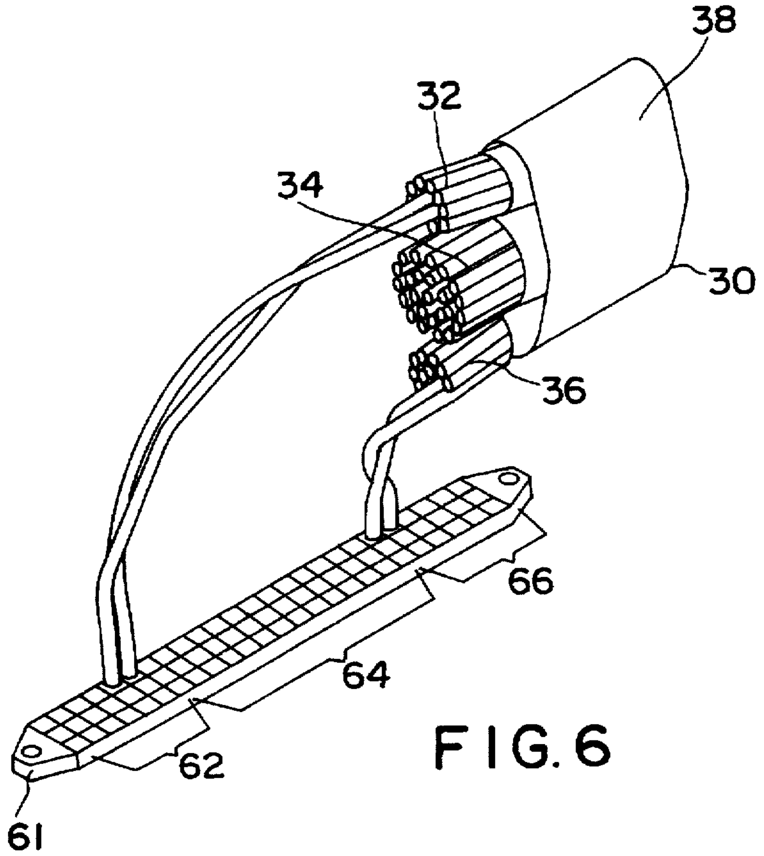
FIG. 6 shows a method of connecting communications cables to a connector of a modular assembly according to the present invention.

An improved cable and connection system has been devised for use in conjunction with the present invention. FIG. 6 shows a connecting cable 30 according to the present invention, including data reception cables 32 and data transmission cables 36, disposed on opposite sides of phone cables 34. Additionally, data reception terminals 62 and data transmission terminals 66 are separated on terminal block 61 by phone terminals 64. This spacing of data reception cables 32 and data transmission cables 36, as well as the spacing between the corresponding terminals, reduces near end cross talk and allows operation of the system at higher transmission speeds.

Although not shown, modular assemblies 45 have the same external appearance as modular assemblies 35. However, as can be seen from FIG. 1, cables 42 are not inverted between connectors 70. Rather, they are passed straight through from a terminal on a first connector 70 to the corresponding terminal on the second connector 70. Similarly, modular assembly 55 (FIG. 4) does not invert data transmission cables 52, phone cables 54 or data reception cables 56. Rather, they are passed straight through between connectors 80. Additionally, note that connectors 80 of modular assemblies 55 have a different configuration than connectors 60 and 70. Connectors 80 are of the type typically associated with telephone or computer-type jack and connector arrangements.

Figure 7:
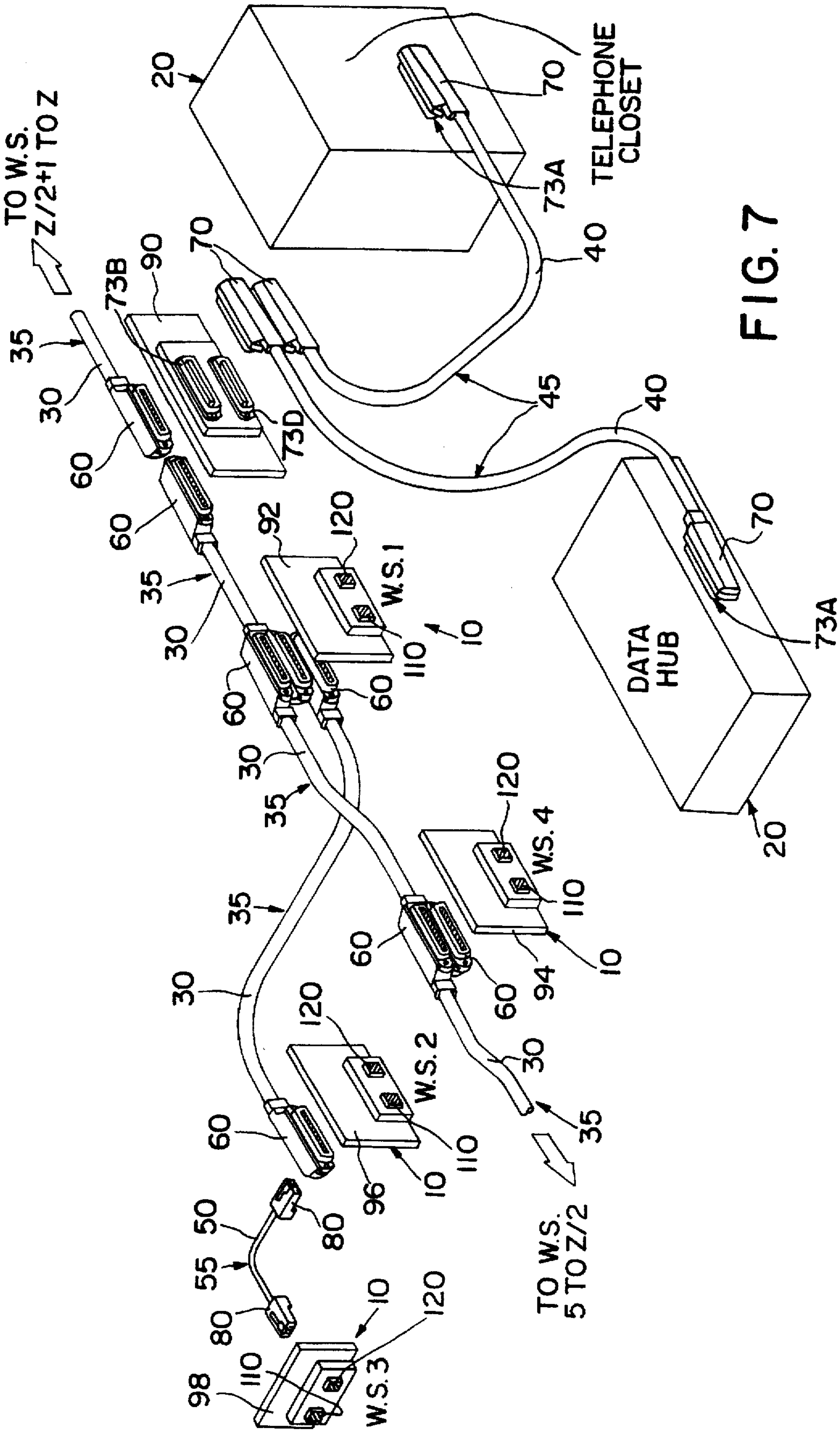
FIG. 7 shows components which may be utilized to construct the workstation arrangement shown in FIG. 1.

FIG. 7 shows the various components utilized to effect the wiring system shown in FIG. 1. As can be seen in FIG. 7, the data hub of communication center 20 is linked to interconnection module 90 by plugging one connector 70 of a modular assembly 65 into port 73A and plugging the corresponding connector 70 into port 73B on interconnection module 90. The telephone closet of communications center 20 is similarly linked to interconnection module 90 via another modular assembly 65 and ports 73C and 73D. A pair of modular assemblies 35 is then coupled to the back of interconnection module 90 to provide access to communications center 20 for workstations 1 through 6 and 7 through 12. This connection is made by plugging a connector 60 of each modular assembly 35 into either port 63A or 63I on the back of modular assembly 90, which are of the same construction as ports 73X, although are not shown in FIG. 7. Similarly, additional modular assemblies 35 are used to link workstation 1 to workstations 2 and 4 and to link workstation 4 to workstation 5 and workstation 5 to workstation 6. Thus, ports 63B, 63C and 63F are provided on the back of interconnection module 92 at workstation 1, ports 63D, 63E and 83A are provided on the back of interconnection module 96 at workstation 2, and ports 63G and 63H are provided on the back of interconnection module 94 at workstation 4. Workstation 3 is linked to workstation 2 via an interconnection module 55. Each workstation is provided with communication connectors 110 and 120, which provide outlets for telephones and computers. Note that the ports 83*x* designed to mate with connectors 80 of interconnection module 55 will have the same configuration as communications connectors 110 and 120.

Figure 8:
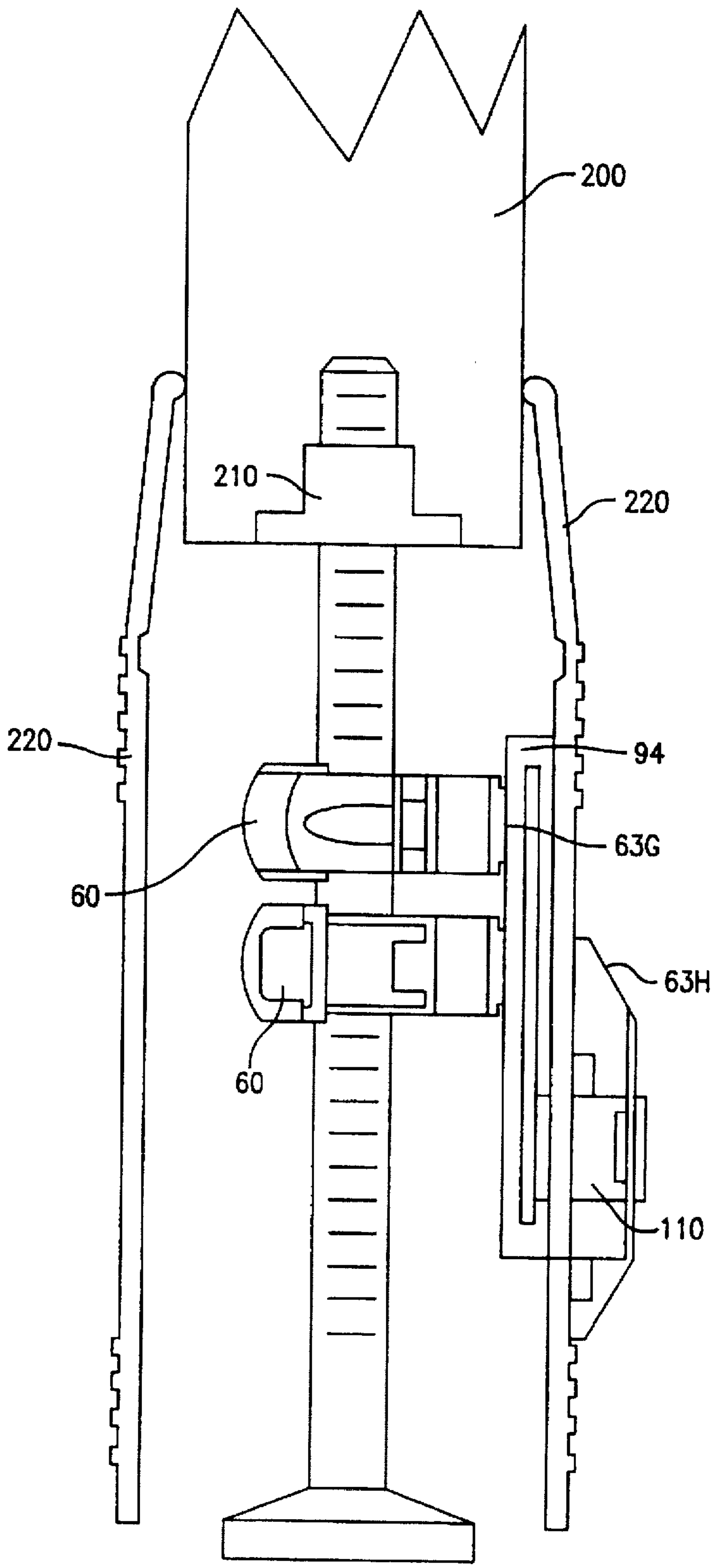
FIG. 8 shows a method of attaching components according to the present invention to a modular wall panel.

FIG. 8 shows one manner in which the various connection components may be used in conjunction with a modular wall panel 200. The components associated with workstation 4 are used for purposes of illustration. Modular wall panel 200 is shown being supported by support means 210. However, any number of support means may be used to support modular wall panel 210 at a height appropriate for utilizing face plate 220, which conceals the various components, with wall panel 200.

From the foregoing description of the preferred embodiment, several advantages of the present invention will now be readily apparent. First, although FIG. 1 shows a workstation arrangement having four straight line workstations and a branched chain of two workstations, various configurations are possible by utilizing different combinations of the connection components. For example, a straight chain of six workstations could be formed by utilizing six interconnection modules 94, and the associated components. Similarly, a chain of four straight workstations with two single branched workstations could be formed by utilizing two interconnection modules 94, two interconnection modules 96, and two interconnection modules 98, along with the associated components. Various other configurations could be formed by utilizing different combinations of interconnection modules.

Furthermore, because the interconnection modules are symmetrical about their vertical axes, the pattern of connection between any straight line of workstations is irrelevant. For example, port 63H could be connected to port 63F, without any effect on the operation of the system. Note that the same is true with respect to other ports 63*x* that are not used to originate a branch. Thus, although port 63E could be coupled to port 63C, port 63C could not be coupled to port 63A.

Additionally, as noted in FIG. 1 (but not shown) workstations may extend from communications center 20 in more than one direction. For example, additional workstations 7 through 12 could extend from the left side of communications center 20.

Also, although the system shown in FIG. 1 utilizes twelve data reception lines and data transmission lines, and twenty-four phone lines, a greater or lesser number of lines could be utilized as long as the described wiring pattern is maintained. Furthermore, it is anticipated that this system may be utilized with fiber optics, instead of traditional electrical cables. In such a system, only one or two lines would be needed to carry all communications.

Although the invention has been described and illustrated in detail, it is to be clearly understood that the same is intended by way of illustration and example only and is not to be taken by way of limitation. The spirit and scope of the invention are to be limited only by the terms of the appended claims.

I claim:

1. In a wiring arrangement for providing data and phone communication channels to a plurality of workstations arranged in a network, the improvement comprising:

a modular assembly for linking said data and phone communication channels to said plurality of workstations, said modular assembly comprising a cable having connection systems at opposite ends thereof, said cable comprising a plurality of data reception lines, a plurality of data transmission lines, and a plurality of phone lines, said plurality of phone lines being positioned between and separating said plurality of data reception lines from said plurality of data transmission lines so as to prevent cross-talk from occurring in said data reception and transmission lines.

2. A wiring arrangement according to claim 1, wherein said plurality of phone lines define a phone cable.

3. A wiring arrangement according to claim 2, wherein said plurality of data reception lines and said plurality of data transmission lines separately define a data reception cable and a data transmission cable.

4. A wiring arrangement according to claim 3, wherein said phone cable, said data reception cable, and said data transmission cable are contained within a common outer casing.

5. In a wiring arrangement for providing data and phone communication channels to a plurality of workstations arranged in a network, the improvement comprising:

a modular assembly for linking said data and phone communication channels to said plurality of workstations, said modular assembly comprising a cable having connections systems at opposite ends thereof, said cable including:

a casing;

a plurality of data reception lines located in said casing;

a plurality of data transmission lines located in said casing; and a plurality of phone lines located in said casing, said plurality of phone lines being positioned between and separating said plurality of data reception lines from said plurality of data transmission lines so as to prevent cross-talk from occurring in said data reception and transmission lines.

6. A wiring system according to claim 5, wherein said plurality of phone lines define a phone cable.

7. A wiring system according to claim 6, wherein said plurality of data reception lines and said plurality of data transmission lines separately define a data reception cable and a data transmission cable.

8. In a wiring arrangement for providing data and phone communication channels to a plurality of workstations arranged in a network, the improvement comprising:

a modular assembly for linking said data and phone communication channels to said plurality of workstations, said modular assembly comprising a cable having connections systems at opposite ends thereof, said cable including:

a plurality of data reception lines having a central axis;

a plurality of data transmission lines having a central axis; and a plurality of phone lines having a central axis, said plurality of phone lines being positioned between and separating said plurality of data reception lines from said plurality of data transmission lines so as to prevent cross-talk from occurring in said data reception and transmission lines, and said central axes of each of said plurality of data reception lines, said plurality of data transmission lines, and said plurality of phone lines being substantially within a common plane.

9. A wiring system according to claim 8, wherein said plurality of phone lines define a phone cable.

10. A wiring system according to claim 9, wherein said plurality of data reception lines and said plurality of data transmission lines separately define a data reception cable and a data transmission cable.

11. A wiring system according to claim 10, wherein said phone cable, said data reception cable, and said data transmission cable are contained with a common outer casing.

12. In a wiring arrangement for providing data and phone communication channels to a plurality of workstations arranged in a network, the improvement comprising:

a modular assembly for linking said data and phone communication channels to said plurality of workstations, said modular assembly comprising a cable having connections systems at opposite ends thereof, said cable including:

a plurality of data reception lines;

a plurality of data transmission lines; and a plurality of phone lines;

said plurality data reception lines being positioned axially along one side of said plurality of phone lines and said plurality of data transmission lines being positioned axially along an opposite side of said plurality of phone lines so as to prevent cross-talk from occurring in said data reception and transmission lines.

13. A wiring arrangement according to claim 12, wherein said plurality of data reception lines are positioned adjacent said plurality of phone lines along said one side thereof and said plurality of transmission lines are positioned adjacent said plurality of phone lines along said opposite side thereof.

14. A wiring arrangement according to claim 12, wherein said one side of said plurality of phone lines and said opposite side of said plurality of phone lines are radially spaced apart at approximately 180°.

15. A wiring system according to claim 13, wherein said plurality of phone lines define a phone cable.

16. A wiring system according to claim 15, wherein said plurality of data reception lines and said plurality of data transmission lines separately define a data reception cable and a data transmission cable.

17. A wiring system according to claim 16, wherein said phone cable, said data reception cable, and said data transmission cable are contained with a common outer casing.

18. A wiring system according to claim 13, wherein said plurality of phone lines define a phone cable.

19. A wiring system according to claim 18, wherein said plurality of data reception lines and said plurality of data transmission lines separately define a data reception cable and a data transmission cable.

20. A wiring system according to claim 19, wherein said phone cable, said data reception cable, and said data transmission cable are contained with a common outer casing.

* * * * *